United States Patent [19]

Kolm

[11] Patent Number: 4,969,401
[45] Date of Patent: Nov. 13, 1990

[54] ACTIVE DAMPING SYSTEM FOR RESILIENTLY LEVITATED VEHICLES

[76] Inventor: Henry H. Kolm, Weir Meadow, Wayland, Mass. 01778

[21] Appl. No.: 323,330

[22] Filed: Mar. 14, 1989

[51] Int. Cl.[5] .................... B60L 15/00; B60L 13/06
[52] U.S. Cl. ................................. 104/284; 104/295
[58] Field of Search .......................... 246/34 R, 104; 104/281–285; 505/904, 905; 74/5.6 E

[56] References Cited

U.S. PATENT DOCUMENTS

| | | | |
|---|---|---|---|
| 3,736,880 | 6/1973 | Ross | 104/282 |
| 3,911,829 | 10/1975 | Ross et al. | 104/23.2 X |
| 4,505,206 | 3/1985 | Gottzein et al. | 104/284 |
| 4,648,567 | 3/1987 | Maudal et al. | 244/3.24 |
| 4,678,141 | 7/1987 | Sarrantonio | 244/2 |
| 4,836,470 | 6/1989 | Criswell | 244/2 |

Primary Examiner—Andres Kashnikow
Assistant Examiner—Virna Lissi Mojica
Attorney, Agent, or Firm—Joseph S. Iandiorio; Brian M. Dingman

[57] ABSTRACT

A control system for stabilizing a vehicle resiliently levitated above a guideway including at least two sets of at least two aerodynamic control means mounted on the vehicle. The sets of aerodynamic control means are spaced longitudinally along the vehicle and the control means in each set are spaced on the vehicle. Further included are means for sensing the acceleration of the vehicle in at least one mode of oscillation and means, responsive to the means for sensing acceleration, for operating the aerodynamic control means to provide offsetting forces and moments for correcting the sensed acceleration to damp vehicle oscillation.

21 Claims, 5 Drawing Sheets

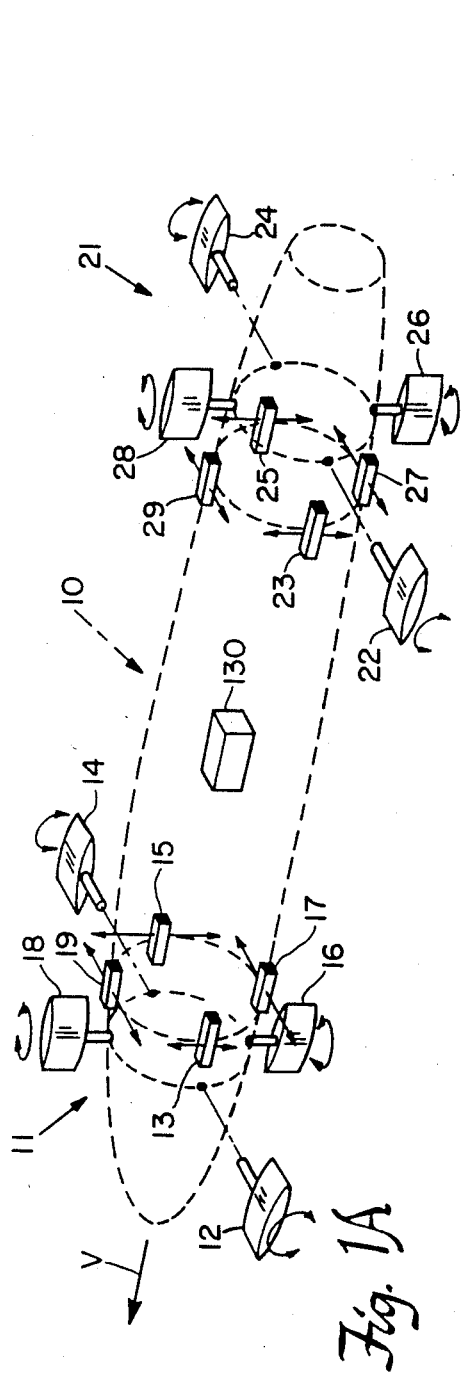
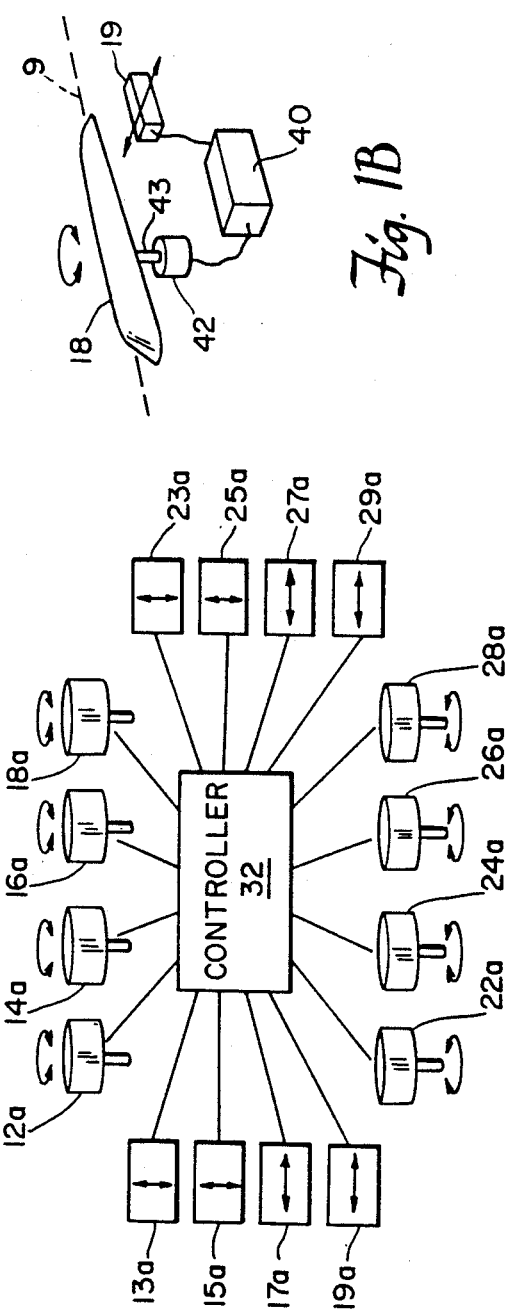

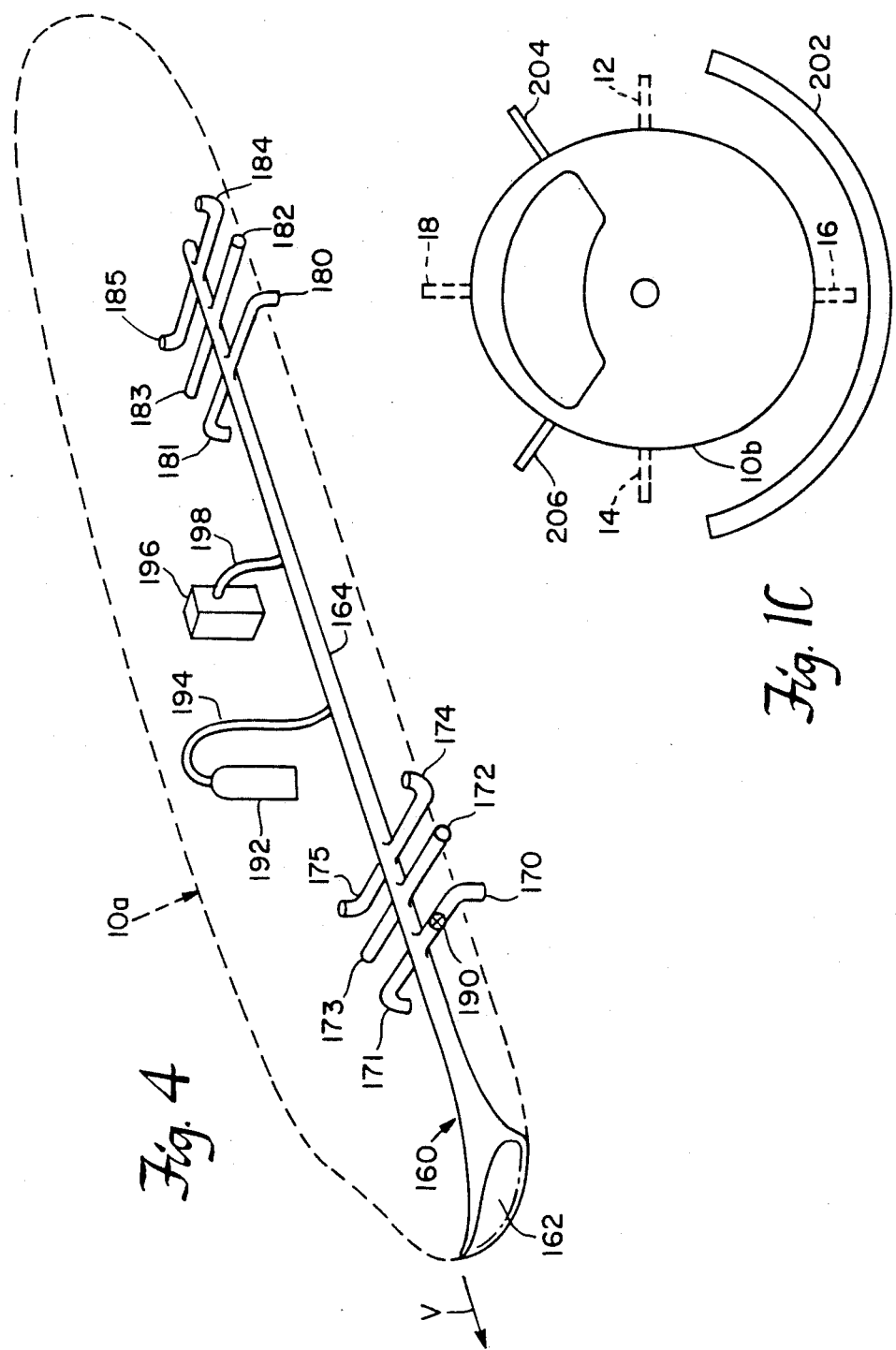

ACTIVE DAMPING SYSTEM FOR RESILIENTLY LEVITATED VEHICLES

FIELD OF INVENTION

This invention relates to an active damping system for resiliently levitated vehicle and more particularly to such a system which damps unwanted motion in all five degrees of vehicle freedom.

BACKGROUND OF INVENTION

Magnetically levitated transportation vehicles have been disclosed in U.S. Pat. No. 3,768,417. These vehicles travel above a guideway trough, and are able to achieve speeds of 200 miles per hour or more.

However, in tests of scale model vehicles it was found that the moving vehicle was subject to oscillatory motion, in all five degrees of freedom, caused by irregularities in the guideway, wind gusts, nearby buildings and oncoming vehicles. Because the vehicles are inherently undamped, a perturbation tended to produce oscillations, which would create an uncomfortable ride for passengers.

A system for stabilizing the vehicles and actively damping the oscillations was disclosed in U.S. Pat. No. 3,871,301, incorporated herein by reference. In that control system, the phase of the linear propulsion field was adjusted in response to a vehicle mounted vertical acceleration sensor to generate small vertical forces to counteract instantaneous vertical acceleration. That system damped heave, or vertical motion, and also reduced the pitch oscillation, or rotation about a transverse axis, caused by heave-pitch coupling.

However, this single-axis active damping system could directly damp only vertical oscillations. It could also indirectly, but not directly, damp oscillations in all other modes, (such as pitch oscillations cited above) since all modes are coupled. That is, oscillations in any one mode produce oscillations in every other mode. This indirect damping of the other oscillation modes does not occur instantly, however, causing an uncomfortable ride.

For example, if a crosswind gust or a lateral guideway discontinuity induces a lateral oscillation (sway) of the vehicle, this swaying motion will produce vertical oscillation (heave) due to the fact that the magnetic and aerodynamic lift forces depend on the lateral position of the vehicle with respect to its guideway. This heave oscillation will be damped instantly by the active vertical damping system, and thereby the sway oscillations will also be damped, but only after they have persisted long enough to induce the heave oscillations.

SUMMARY OF INVENTION

It is therefore an object of this invention to provide a system for actively damping oscillations of a resiliently levitated vehicle in all of its degrees of freedom.

It is a further object of this invention to provide such a damping system which is independent of the vehicle propulsion system.

It is a further object of this invention to provide such a damping system which does not interfere with coordinated banking.

It is a further object of this invention to provide such a damping system which responds primarily directly to sensed vehicle accelerations.

It is a further object of this invention to provide such a damping system which responds secondarily to sensed vehicle displacements.

It is a further object of this invention to provide such a damping system which also contributes to vehicle lift.

This invention results from the realization that damping systems for resiliently levitated vehicles can be dramatically improved by providing a control system including aerodynamic control surfaces or jet thrusters in spaced positions along the vehicle for creating forces and moments to counteract unwanted vehicle displacement and rotation.

This invention features a control system for stabilizing a vehicle resiliently levitated above a guideway, including at least two sets of at least two aerodynamic control means mounted on the vehicle. The sets of aerodynamic control means are spaced longitudinally along the vehicle and the aerodynamic control means in each set are spaced on the vehicle. Further included are means for sensing the acceleration of the vehicle in at least one mode of oscillation, and means, responsive to the means for sensing, for operating the aerodynamic control means to provide offsetting forces and moments to correct the sensed acceleration and damp the oscillation. There are preferably three or four aerodynamic control means in each set, which may or may not be equally spaced circumferentially about the vehicle. Alternatively, the control means in at least one set may be spaced longitudinally along the vehicle. Preferably, there is one set of aerodynamic control means forward of the vehicle center and one set rearward of the center.

The control means may include vane means projecting from the vehicle. The sets of vanes may include two, three, four or more vanes spaced about the vehicle. Alternatively, the control means may include jet means. The means for operating the control means may include means for altering the attitude of the vane means relative to the vehicle or means for supplying pressurized fluid to operate the jet means. The means for supplying pressurized fluid may include an air intake; in that case, the means for operating the jets may include means for selectively directing air from the intake means to the jet means. This may be accomplished with valves.

There may also be included means for determining the distance of the vehicle from the guideway. Further included may be means for detecting the curves in the guideway. That may be accomplished with means for sensing the acceleration of the vehicle relative to the ground. That sensing may be accomplished with an on-board inertially stabilized platform carrying at least one acceleration sensing means. The means for operating the control means is preferably responsive to the means for detecting curves to maintain the vehicle on a smooth path and in a coordinated bank. Preferably, the control system includes at least one acceleration sensor for each of the five modes of vehicle oscillation.

In a preferred embodiment, the control system includes means for sensing the deviations in the position of the vehicle relative to the guideway, first means for sensing the acceleration of the vehicle in all modes of oscillation and second means for sensing the acceleration of the vehicle in relation to an on-board inertial platform. In that case, the means for operating the aerodynamic control means are responsive to the sensed deviations and the first and second sensed accelerations for providing offsetting forces and moments to correct the sensed deviations and accelerations to damp vehicle oscillation.

DISCLOSURE OF PREFERRED EMBODIMENT

Other objects, features and advantages will occur from the following description of a preferred embodiment and the accompanying drawings, in which:

FIG. 1A is an axonometric, diagrammatic view of a resiliently levitated vehicle with control vanes for damping vehicle oscillations according to this invention;

FIG. 1B is an axonometric, diagrammatic view of a single vane of the system of FIG. 1A along with its controller and acceleration sensor;

FIG. 1C is a diagrammatic front elevational view of a vehicle similar to that shown in FIG. 1A showing the most simple arrangement of control vanes of the system according to this invention;

FIG. 2 is a schematic diagram of an alternative means of controlling the vanes of FIG. 1A;

FIG. 4 is an axonometric, diagrammatic view of control jets used in lieu of the vanes of FIG. 1A.

Figure 3A:
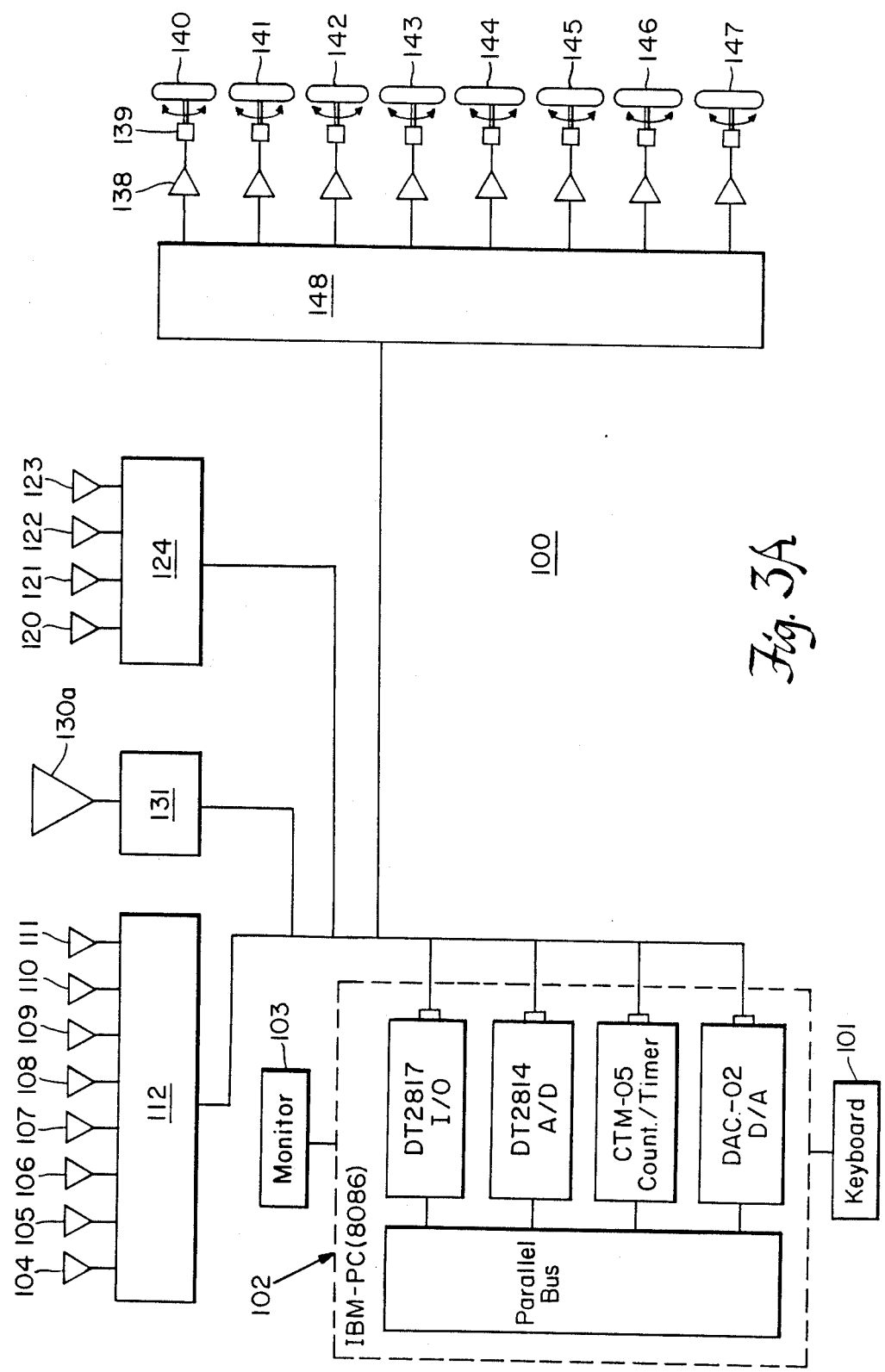
FIG. 3A is a schematic diagram of a damping system according to this invention for control of vehicles performing complex maneuvers.

This invention may be accomplished with a damping system for stabilizing a resiliently levitated vehicle, for example a magnetically levitated vehicle, moving above a guideway. The damping system includes at least two sets of aerodynamic control means mounted on the vehicle. Each set includes at least two control means, such as vanes or jets, spaced on the vehicle. The sets of aerodynamic control means are themselves spaced longitudinally along the vehicle. The damping system further includes means for sensing the acceleration of the vehicle in at least one degree of freedom, and means for operating the aerodynamic control means to provide offsetting forces and moments to correct the sensed acceleration.

The damping system according to this invention is most effective if it responds primarily to accelerations in all modes of oscillation, and only secondarily to displacements with respect to the guideway; in other words, a system which is primarily inertial in response. This may be accomplished with a control system which responds to two sets of sensors when travelling along a straight guideway, and a third set of sensors when negotiating curves or grades. The first set of sensors is a set of inertial sensors or accelerometers fixed to the vehicle which sense acceleration in each of the five modes. The second is a set of proximity sensors which sense vehicle position and attitude with respect to the guideway. These two sets of sensors suffice for operation on a straight guideway without curves or grades. A third set of sensors is required for negotiating curves and grades, as is explained below.

The inertial sensors may be linear accelerometers or gyroscopic rotation sensors, or a combination thereof, such as are customarily used in inertial guidance systems for aircraft and spacecraft. For example, a set of two linear accelerometers spaced along the vehicle with their sensing axes vertical can detect accelerations in heave and in pitch. Heave will be indicated by accelerations in the same direction, while pitch will be detected by acceleration in opposite directions. A single gyroscopic sensor, on the other hand, can detect only rotary acceleration, i.e., pitch or yaw acceleration. Linear accelerometers are therefore preferred.

The position deviation sensors may be proximity sensors, such a capacitive, inductive, optical or acoustical sensors, which measure vehicle proximity to guideway surfaces or edges at several positions along the vehicle. Suitable proximity sensors are manufactured by Kaman Instrument Corporation, in Colorado Springs, CO.

The third set of sensors includes inertial platform sensors, which may be accomplished with a set of three accelerometers attached to a platform stabilized in inertial space by gyroscopes, called an inertial platform. Such platforms are used in inertial guidance systems. In the damping system according to this invention the inertial platform serves to detect horizontal or vertical curvature of the guideway, both of which could not otherwise be distinguished from yawing or pitching motions detected by the accelerometers.

The control system for the sensors preferably incorporates a central processor which has the primary function of adjusting the aerodynamic control means in such a way as to oppose any acceleration in position or attitude, thereby maintaining a straight line inertial trajectory by cancelling any disturbances caused by guideway irregularities or crosswind gusts.

This primary function, however, must be overruled by the inertial platform sensors or the position sensors under certain conditions, for example, when the guideway diverges from a straight line and begins a curve or an incline. Such an event will be detected by the inertial platform sensors and by the proximity sensors as the bow or the stern of the vehicle approaches or recedes from the guideway. Thus, when guideway proximity exceeds certain predetermined maximum or minimum values, the aerodynamic system must be controlled by a higher priority algorithm which restores proper clearance, as is explained below.

There is shown in FIG. 1A magnetically levitated vehicle 10, shown in phantom, such as the vehicle disclosed in U.S. Pat. No. 3,768,417, incorporated herein by reference, moving in the direction of arrow V. The damping system according to this invention includes two sets 11 and 21 of four control vanes mounted on the vehicle. The forward set 11 includes vanes 12, 14, 16 and 18, and the rear set 21 includes vanes 22, 24, 26 and 28. The control vanes in each set 11 and 21 are spaced circumferentially around vehicle 10, for example at 90° intervals as shown, and are rotatable in the direction of the arrows to control the position and attitude of vehicle 10 relative to the guideway, not shown, as is more fully described below. Side control vanes 12, 14, 22 and 24 may also contribute to vehicle lift.

Associated with each control vane is an accelerometer. Accelerometers 13, 15, 17 and 19 are associated with control vanes 12, 14, 16 and 18, respectively, of the forward set 11 of control vanes, and accelerometers 23, 25, 27 and 29 are associated with control vanes 22, 24, 26 and 28, respectively, of the rear set 21 of control vanes. The accelerometers sense local vehicle acceleration in the direction of the arrows and pass that information to the vane controllers, not shown. Vehicle 10 includes inertial platform 130, explained below.

A sensor suitable for detecting acceleration is the Model 141 High Output Linear Accelerometer manufactured by Setra Systems, Inc., in Acton, MA. It is sensitive in both directions, and is available in eight nominal acceleration ranges, from 2 to 600 gee acceleration.

The operation of the control vanes of FIG. 1A is more clearly shown in FIG. 1B. Control vane 18 is connected to motor 42 by shaft 43. Accelerometer 19 detects acceleration in the direction of arrow 19, perpendicular to longitudinal axis 9 of control vane 18. Controller 40 is responsive to accelerometer 19, and controls motor 42 to rotate vane 18 on shaft 43 to correct instantaneous accelerations sensed by accelerometer 19. Controller 40 operates motor 42 to rotate vane 18 in such a direction as to oppose the sensed acceleration and reduce it to zero.

With the two sets of four mutually perpendicular control vanes of FIG. 1A, each vane can operate independently of the other vanes to provide a relatively simple stabilization system. However, sets of only three vanes each would permit control provided there was a common control system for all of the vanes as is more fully described below.

The control system of FIG. 1A, with two sets of four mutually perpendicular control vanes each separately controlled by a motor controller responsive to an accelerometer, can account for damping responsive to acceleration in each of the five modes which need to be controlled. Table I shows which control vanes of FIG. 1A must be rotated to suppress acceleration in each of the modes.

TABLE I

|       | 12 | 14 | 16 | 18 | 22 | 24 | 26 | 28 |
|-------|----|----|----|----|----|----|----|----|
| Heave | X  | X  |    |    | X  | X  |    |    |
| Sway  |    |    | X  | X  |    |    | X  | X  |
| Pitch | X  | X  |    |    | X  | X  |    |    |
| Yaw   |    |    | X  | X  |    |    | X  | X  |
| Roll  | X  | X  | X  | X  | X  | X  | X  | X  |

For heave and sway control, the control vanes are moved in unison. For pitch and yaw compensation, the front and rear pairs act in opposition to each other. Finally, for roll compensation, each control vane acts in unison with its longitudinally opposite counterpart and in opposition to its laterally opposite counterpart. For example, vane 12 would act in unison with vane 22 and in opposition to vane 14.

The most simple arrangement of control vanes is shown in FIG. 1C. Vehicle 10b travelling above guideway 202 includes front control vanes 204 and 206, and a similar rear set, not shown. With a control system, not shown, responsive to all four vanes, control of attitude and position may be accomplished.

FIG. 1C also illustrates a potential problem with the use of four equally spaced control vanes in each set, vanes 12, 14, 16 and 18, shown in phantom. Vehicle 10b rides above trough-shaped guideway 222. Since bottom vane 16 may interfere with guideway 202, the control vanes are preferably not equally spaced about the vehicle. In that case, bottom vane 16 is preferably removed to leave three control vanes, such as vanes 12, 14 and 18, in each set. If jets are used in place of control vanes, as described below in conjunction with FIG. 4, they may be arranged circumferentially in place of control vanes 204 and 206, or 12, 14, 18 and 16, without interfering with guideway 202.

A system for centrally controlling the control vanes of FIG. 1A, as well as FIG. 1C, is shown in FIG. 2. Controller 32 is responsive to forward accelerometers 13a and 15a for detecting vertical accelerations, and forward accelerometers 17a and 19a for detecting horizontal accelerations. Controller 32 is further responsive to rear accelerometers 23a and 25a for detecting vertical accelerations, and rear accelerometers 27a and 29a for detecting horizontal accelerations. Controller 32 causes the rotation of one or more of bow control vanes 12a, 14a, 16a and 18a and stern control vanes 22a, 24a, 26a and 28a to counteract the sensed accelerations.

The control system of FIG. 2 described above is the most primitive central control system possible, and is adequate for motion along a straight guideway, without horizontal or vertical curvature. Its central controller 32 may consist of a simple array of NOR gates, such as logic modules 74AC02, for example, arranged in a manner which is known by those skilled in the art.

A vehicle travelling along a guideway having horizontal and vertical curvature will have to perform complex maneuvers, and will require a more complex stabilization and damping system, such as system 100 shown schematically in FIG. 3A.

For a vehicle travelling along a curved guideway, the vehicle should negotiate all curves at a coordinate bank angle. The guideway is banked at an angle which is correct only for one particular speed. The magnetic levitation and guidance forces will impose this bank angle, and resiliency of the suspension will allow pendulum forces to correct the vehicle's bank to make it accurately coordinated, providing the center of mass is below the center of lift. The vehicle will therefore roll into a coordinated bank.

However, the simple damping system of FIG. 2 would interfere with this process because the linear accelerometers described above could not distinguish between incorrect bank angle and sway oscillation. Both would be sensed as lateral acceleration of the vehicle. The primitive system would therefore apply lateral forces instead of rolling movements in attempting to correct the bank angle. Similarly, in the case of vertical curvature of the guideway, the simple linear accelerometers of FIG. 2 could not distinguish the onset of a grade from a pitch oscillation, and would attempt to prevent the vehicle from following the guideway.

The more complex control system 100 of FIG. 3A is therefore required to assist and stabilize the maneuver of rolling into a coordinated bank, or entering an inclined section of guideway, for example.

To resolve the ambiguity between heave oscillation and curve entry, or between pitch oscillation and grade onset, the control system requires input from two additional sensors: a gyroscopically stabilized inertial platform which can detect horizontal or vertical curvature of the guideway, and proximity sensors, which can sense the proximity of the vehicle's bow or stern to the guideway. It also requires a central controller capable of prioritizing among five different control algorithms: a simple five-mode damping control for travel along a straight guideway, a bank coordination algorithm for entering a horizontal curve, a grade onset algorithm for entering an incline, a steady climb/descent algorithm for following a steady grade, and a proximity priority over-ride algorithm for preventing guideway contact or departure from the guideway if proximity exceeds prescribed maximum and minimum limits.

Although it is possible to implement such a control system with a hard-wired array of NOR gates, as in the control system of FIG. 2, it is preferable to use a software-controlled system based on a computer. To accomplish all of the functions explained above, the complex control system 100 shown in FIG. 3A comprises the following components.

Central controller 102, for example based on an IBM personal computer as shown, includes monitor 103 and keyboard 101, with an Intel 8086 processor, and commercially available data acquisition and control cards to interface with the vane actuators. Suitable supplementary control cards are, for example: a DT2817 input/output card, a DT1824 analog/digital converter, a DAC-02 digital/analog converter, and a CTM-05 counter/timer connected by a parallel bus.

A set of eight linear accelerometers 104 to 111, for example four surrounding the bow end and four surrounding the stern end as shown in FIG. 1A, detect acceleration in all five modes. Accelerometers 104–111 are connected to controller 102 through bus interface 112.

A set of four guideway proximity sensors 120–123, such as proximity sensors made by Kaman Instrument Corporation of 1500 Garden of the Gods Road, Colorado Springs, CO, are preferably mounted on the sides of the vehicle at the front and rear as shown by bow sensors 32 and 34 and stern sensors 36 and 38, FIG. 1A. Proximity sensors 120–123 detect the distance of the vehicle from the guideway, and are connected to controller 102 through bus interface 124.

Inertial platform 130a preferably includes three internal accelerometers. Inertial guidance platforms commercially available from the Northrop Precision Products Corporation in Norwood, MA, may be used. Inertial platform 130a is connected to controller 102 through bus interface 131.

A set of eight control vanes 140–147, for example four surrounding the bow end and four surrounding the stern end of the vehicle, as shown in FIG. 1A, are included. Each control vane is driven by an actuating motor, which in turn is energized by an operational amplifier, for example motor 139 and op-amp 138 for vane 140. Suitable units are, for example, Model 211 300-watt power op-amp, manufactured by Torque Systems, Inc., of 225 Crescent Street, Waltham, MA. All of the individual op-amps are connected to current regulator and position limit control 148, which in turn is controlled by computer 102. The vane actuator control system is analogous to control systems used to control the position of aircraft landing flaps, for example systems manufactured by the Calco Corporation. These systems are feed-back controlled to ensure that the vane position corresponds to the required setting.

Figure 3B:
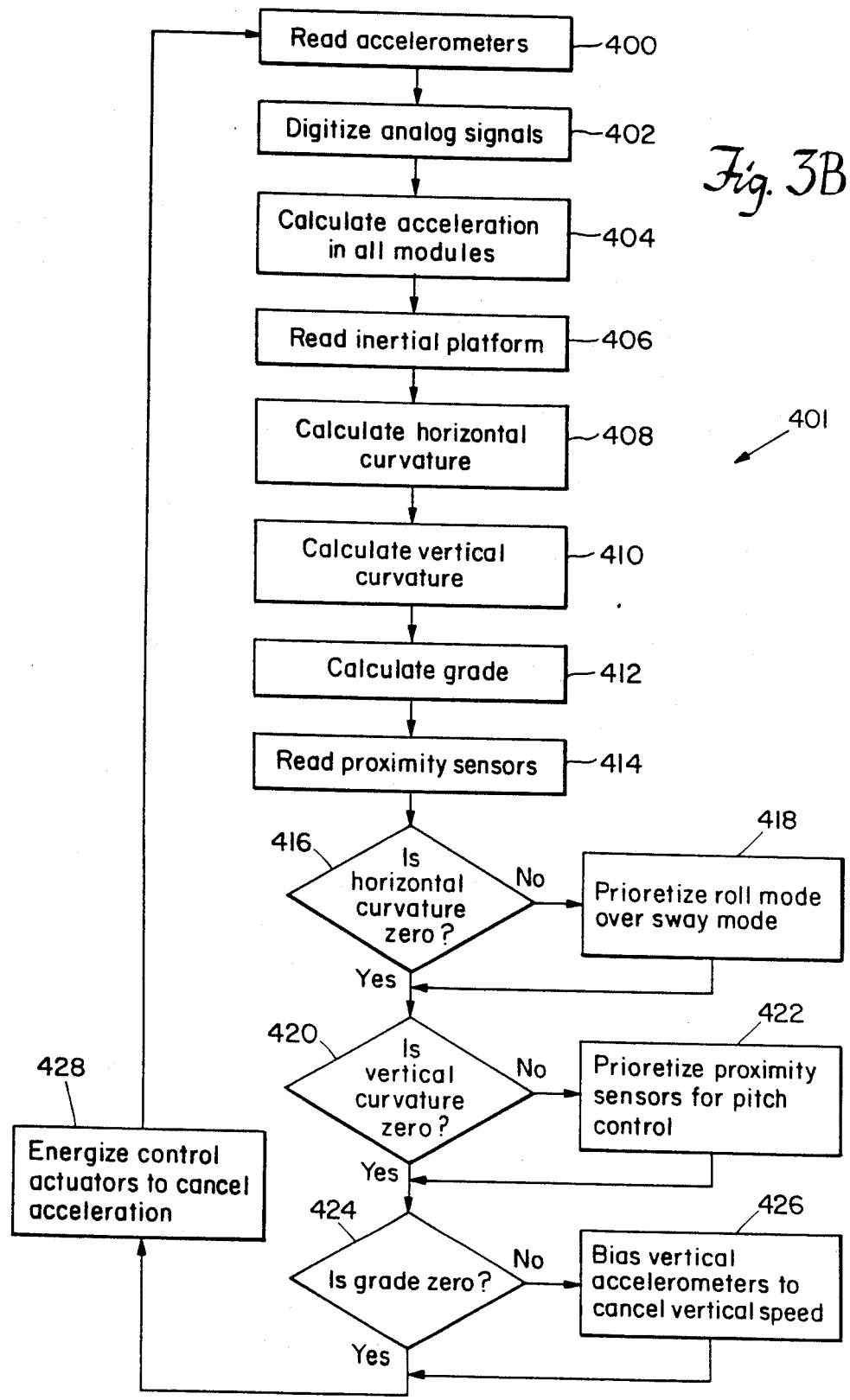
FIG. 3B is a software flow chart for the system of FIG. 3A.

A software flow chart which describes the operating algorithms of central controller 102, FIG. 3A, is shown in FIG. 3B. Data from accelerometers 104–111 is read, step 400, through data bus interface 112, FIG. 3A. The analog signals are digitized, step 402, and the computer translates the digital information into accelerations in each of the five oscillation modes: heave, sway, pitch, yaw and roll, in step 404. In the most simple example of straight line travel the control system would pass through to step 428, where the appropriate correcting forces and moments are applied by control vanes such as vanes 140–147, FIG. 3A, through their respective actuators. The applied forces and moments just suffice to cancel the sensed accelerations, and thus the perturbations in all modes are damped before they actually become oscillations. The active damping system according to this invention results in a much more comfortable ride than the passive damping applied by the shock absorbers of automobiles, busses or railroad cars.

After step 404, inertial platform 130a is read, step 406, and the horizontal and vertical curvature is calculated, steps 408 and 410. The grade is calculated at step 412, and proximity sensors 120 through 123 are read in step 414.

Program 401 branches at step 416. If horizontal guideway curvature is detected by the inertial platform, which remains upright in the ground-reference coordinates, the computer at step 418 prioritizes roll mode corrections over sway mode corrections. In other words, the computer is told that lateral acceleration, which would normally be corrected by applying sway forces, should now be corrected by applying roll moments instead. This mode is maintained as long as the inertial platform detects horizontal guideway curvature. The roll mode priority algorithm of step 418 thus controls curve entry and curve exit and also helps maintain a coordinated bank during the curve.

At step 420 the guideway vertical curvature is checked. Guideway vertical curvature is detected by the accelerometers on inertial platform 130a, which maintains a horizontal reference; the onset of a grade is sensed as vertical acceleration. If the guideway begins a climb or descent, at step 422 the computer is told to achieve pitch control on the basis of the proximity sensors rather than the vertical accelerometers. In other words, the control system does not oppose a change in pitch as long as the bow proximity remains within prescribed limits. This algorithm has priority as long as the guideway has vertical curvature. Proximity priority algorithm 422 thus controls entry or exit from an inclined section of guideway.

When the guideway achieves a steady up or down grade, at step 424 control shifts to step 426. At a steady grade, the inertial platform accelerometers will detect a steady upward or downward motion of the vehicle. At step 426 the controller causes the application of a bias to all four vertical accelerometers to cancel the vertical acceleration or rate of climb or descent which is sensed by the inertial platform sensors. Pitch control will then be applied with respect to the steady-state reference pitch as long as the vehicle is maintaining the steady grade. Algorithm 426 thus permits the vehicle to maintain proper pitch during a steady climb or descent, by stabilizing oscillations about the correct pitch.

An alternative to the control vanes of FIG. 1A is shown in FIG. 4. Vehicle 10a includes attitude control jets 170–175 and 180–185. Jets 170, 171, 174 and 175 together provide the forward vertical forces and jets 172 and 173 the forward horizontal forces. Rear jets 180, 181, 184 and 185 together provide rear vertical forces, and jets 182 and 183 the rear horizontal forces. The jets are supplied with pressurized air from plenum 160, connected to ram intake 162 at the front of vehicle 10a and to the main duct 164 leading to each of the jets. Valves such as valve 190 for jet 170 are located between main duct 164 and each of the jets. The centralized or individual control system opens and closes the valves as required to provide the pressurized air to operate the jet. Alternatively, when the vehicle operates in an evacuated tunnel, pressurized fluid could be supplied to jets 170–175 and 180–185 by on board fluid source 192 or compressor 196. Fluid source 192 may be a pressurized stand-alone holding tank as shown, supplying air or another compressed fluid through passageway 194 to main duct 164. Another means of supplying the pressurized fluid is compressor 196, which supplies compressed air through passageway 198 to main duct 164. Compressor 196 may alternatively supply the air to holding tank 192, which in that case would act as a buffer tank to ensure continuous fluid supply to main duct 164.

Although specific features of the invention are shown in some drawings and not others, this is for convenience only as each feature may be combined with any or all of the other features in accordance with the invention.

Other embodiments will occur to those skilled in the art and are with the following claims:

What is claimed is:

1. An active damping system for damping undesirable oscillations in each of the five degrees of freedom associated with a vehicle magnetically repulsively levitated above a guideway comprising:
   at least two sets of at least two aerodynamic control means mounted on said vehicle;
   the sets of aerodynamic control means being spaced longitudinally along the vehicle and said aerodynamic control means in each set being spaced on the vehicle;
   means for sensing the acceleration of the vehicle resulting from oscillation in each of the five degrees of freedom; and
   means, responsive to said means for sensing, for operating said aerodynamic control means to provide offsetting forces and moments for correcting the sensed acceleration to damp vehicle oscillation.

2. The active damping system of claim 1 in which said aerodynamic control means in each set are equally spaced circumferentially about the vehicle.

3. The active damping system of claim 1 in which at least one set of aerodynamic control means includes four aerodynamic control means equally spaced circumferentially about the vehicle.

4. The active damping system of claim 1 in which said aerodynamic control means include vane means projecting from the vehicle to redirect airflow over the vehicle produced by forward motion.

5. The active damping system of claim 4 in which said means for operating said aerodynamic control means includes means for altering the attitude of said vane means relative to the vehicle.

6. The active damping system of claim 5 in which said means for altering includes servomotor means for controlling the movement of each said vane means.

7. The active damping system of claim 1 in which said aerodynamic control means include jet means.

8. The active damping system of claim 7 further including means for supplying pressurized fluid to said jet means.

9. The active damping system of claim 8 in which said means for supplying includes air intake means for supplying air to said jet means.

10. The active damping system of claim 9 in which said means for operating said aerodynamic control means includes means for selectively directing air from said intake means to said jet means.

11. The active damping system of claim 10 in which said means for selectively directing air includes valve means.

12. The active damping system of claim 1 in which said aerodynamic control means in at least one set are spaced longitudinally on said vehicle.

13. The active damping system of claim 1 in which one set of aerodynamic control means is located forward of the vehicle center and one set is located rearward of the vehicle center.

14. The active damping system of claim 1 further including means for determining the distance of the vehicle from the guideway.

15. The active damping system of claim 1 further including means for detecting curves in the guideway.

16. The active damping system of claim 15 in which said means for detecting curves includes means for sensing the acceleration of the vehicle relative to the ground.

17. The active damping system of claim 16 in which said means for sensing the acceleration of the vehicle relative to the ground includes an inertially stabilized platform carrying at least on acceleration sensing means.

18. The active damping system of claim 15 in which said means for operating said aerodynamic control means is further responsive to said means for detecting curves for maintaining the vehicle on a smooth path and in a coordinated bank as it passes through the curves.

19. The active damping system of claim 1 in which said means for sensing includes at least one accelerometer sensor for each mode of vehicle oscillation.

20. The active damping system of claim 4 in which at least one set of aerodynamic control means includes three aerodynamic control means.

21. An active damping system for damping undesirable oscillations in each of the five degrees of freedom associated with a vehicle traveling an inertial path magnetically repulsively levitated above a guideway comprising:
   two sets of at least two aerodynamic control means mounted on said vehicle;
   the sets of aerodynamic control means being spaced longitudinally along the vehicle and said aerodynamic control means in each set being spaced circumferentially about the vehicle;
   means for sensing deviations in the position of the vehicle relative to the guideway;
   first means for sensing the acceleration of the vehicle resulting from oscillation in each of the five degrees of freedom;
   second means for sensing the acceleration of the vehicle in relation to an on-board inertial platform; and
   means, responsive to said means for sensing acceleration, for operating said aerodynamic control means to provide offsetting forces and moments for correcting the sensed deviations and accelerations to damp vehicle oscillation and maintain the vehicle inertial path; and
   means, responsive to said means for sensing deviations and said first and second means for sensing acceleration, for operating said aerodynamic control means to provide offsetting forces and moments for correcting the sensed deviations and acceleration to damp undesirable vehicle movement and oscillation and maintain the vehicle inertial path.

* * * * *